United States Patent
Ohtsuka et al.

[11] Patent Number: 5,938,172
[45] Date of Patent: Aug. 17, 1999

[54] SOLENOID VALVE DRIVE SYSTEM

[75] Inventors: Masuhiro Ohtsuka; Tsuneo Adachi, both of Higashimatsuyama, Japan

[73] Assignee: Zexel Corporation, Tokyo, Japan

[21] Appl. No.: 08/992,090

[22] Filed: Dec. 17, 1997

[30] Foreign Application Priority Data

Dec. 27, 1996 [JP] Japan .................................. 8-356680

[51] Int. Cl.$^6$ .................................................. F16K 31/06
[52] U.S. Cl. ...................... 251/129.01; 361/155; 361/156
[58] Field of Search ....................... 251/129.01; 361/152, 361/154, 155, 156

[56] References Cited

U.S. PATENT DOCUMENTS

| | | | |
|---|---|---|---|
| 4,112,477 | 9/1978 | Sherwin | 361/155 |
| 4,718,454 | 1/1988 | Appleby | 361/156 X |
| 4,925,156 | 5/1990 | Stoll et al. | 251/129.01 |
| 5,631,801 | 5/1997 | DuPuy | 361/155 X |

FOREIGN PATENT DOCUMENTS

| | | |
|---|---|---|
| 63-34387 | 2/1988 | Japan . |
| 6-26589 | 2/1994 | Japan . |

*Primary Examiner*—Kevin Lee
*Attorney, Agent, or Firm*—Pollock, Vande Sande & Amernick

[57] ABSTRACT

A solenoid valve drive system includes a step-up circuit that produces a first high voltage by using a switching device to on/off control supply of current from a battery to a step-up coil and stores the first high voltage in a first capacitor as a high voltage for initial high-voltage driving of a solenoid valve, a second capacitor, and a discriminating circuit for discriminating the level of the charge voltage of the second capacitor. The second capacitor is charged by high voltage from the step-up circuit only when the charge voltage of the second capacitor has not reached a prescribed level. The system can efficiently produce two types of high voltages without enlarging circuit size.

29 Claims, 7 Drawing Sheets

SOLENOID VALVE DRIVE SYSTEM

BACKGROUND OF THE INVENTION

1. Field of the Invention

The present invention relates to a solenoid valve drive system that drives a solenoid valve at high speed by applying high voltage at the start of solenoid valve driving.

2. Background Art

High-speed driving of a solenoid valve is commonly effected by the well-known method of applying a high voltage that is higher than the power supply voltage to the solenoid valve for a prescribed time period at the initial stage of solenoid valve driving. As taught by Japanese Public Disclosure Nos. Sho 63-34387 and Hei 6-26589, for example, the high voltage used for this purpose is obtained by stepping up DC voltage for driving a control circuit with a step-up chopper. In this type of solenoid valve drive apparatus, a switching device for turning the current supplied to the solenoid valve on and off is used, for example, to on/off control current supplied to the solenoid valve from the step-up chopper and to control the supply of hold current to the solenoid valve after high-voltage driving. Owing to safety considerations, a switching device of this type is generally installed on the high side of the solenoid valve. Usable switching devices include the pnp transistor, p-channel field-effect transistor (FET) and n-channel FET. In view of the need to minimize energy loss in the switching device, however, an n-channel FET is actually used since it has the smallest loss.

Use of an n-channel FET on the high side of the solenoid valve generally requires use of a gate driving voltage of about 30 V, which is higher than the power supply voltage. Since this gate driving voltage is higher than the power supply voltage but lower than the aforesaid high voltage, it has to be separately generated in the drive apparatus. The gate driving voltage can be obtained by, for example, generating it by use of a separately provided step-up circuit used exclusively for this purpose or securing it by use of a voltage step-down circuit comprising a resistor and a voltage-regulation diode installed on the output side of the voltage step-up circuit for generating the high voltage. The former arrangement increases cost owing to the additional circuitry required. The latter arrangement is simple in circuitry but increases energy loss because the high-voltage energy stored in the capacitor of the step-up circuit for generating the high voltage is constantly consumed by the step-down circuit. A voltage of around 30 V is also frequently required for other purposes.

SUMMARY OF THE INVENTION

One object of the invention is to provide a solenoid valve drive system that overcomes the foregoing problems of the prior art.

Another object of the invention is to provide a solenoid valve drive system that efficiently produces a high voltage required for initial high-voltage driving of a solenoid valve and a high voltage lower than this voltage and higher than the power supply voltage, with no increase in circuit size.

Another object of the invention is to provide a solenoid valve drive system that efficiently produces a high voltage required for initial high-voltage driving of a solenoid valve and a high voltage for driving a switching device provided on the high side of the solenoid valve for on/off controlling application of the first said high voltage to the solenoid valve, with no increase in circuit size.

Another object of the invention is to provide a solenoid valve drive system that includes a high-voltage output circuit for generating a high voltage used to operate a solenoid valve at high speed in the initial driving stage and utilizes the high-voltage output circuit to efficiently produce a high DC voltage lower than the first said high voltage and higher than the power supply voltage.

For achieving these objects, this invention provides a solenoid valve drive system having a step-up circuit which includes a step-up coil, a switching device for current chopping and a first capacitor, produces a high voltage in the step-up coil by on/off operating the switching device to chop current supplied to the step-up coil from a low-voltage power supply and stores the high voltage in the first capacitor, the high voltage stored in the first capacitor being applied to a solenoid valve for a prescribed time period at an initial stage of solenoid valve driving to drive the solenoid valve at high speed, the solenoid valve drive system comprising a second capacitor, switching means for controlling supply of high-voltage energy produced in the step-up coil to the second capacitor, discriminating means for discriminating whether or not a charge voltage of the second capacitor has reached a prescribed level, and control means responsive to the discriminating means for keeping the switching means on only when the charge voltage of the second capacitor has not reached the prescribed level.

The discriminating means discriminates the level of the charge voltage stored in the second capacitor and the switching means is on/off controlled by the control means according to the result of the discrimination by the discriminating means so as to charge the second capacitor with high-voltage energy obtained from the step-up circuit as necessary. A voltage of the required level can therefore be obtained from the second capacitor. The high voltage charged in the second capacitor in the foregoing manner can, for example, be used to produce an on/off control voltage for a switching device that controls the application of the high voltage stored in the first capacitor to the solenoid valve.

Another aspect of the invention provides a solenoid valve drive system having a step-up circuit which includes a step-up coil, a switching device for current chopping and a first capacitor, produces a high voltage in the step-up coil by on/off operating the switching device to chop current supplied to the step-up coil from a low-voltage power supply and stores the high voltage in the first capacitor, the high voltage stored in the first capacitor being applied to a solenoid valve for a prescribed time period at an initial stage of solenoid valve driving to drive the solenoid valve at high speed, the solenoid valve drive system comprising a second capacitor, switching means for controlling supply of high-voltage energy produced in the step-up coil to the second capacitor, first discriminating means for discriminating whether or not a charge voltage of the first capacitor has reached a first prescribed level, second discriminating means for discriminating whether or not a charge voltage of the second capacitor has reached a second prescribed level, and charging control means responsive to the first and second discriminating means for on/off operating the switching device for current chopping when the charge voltage of at least one of the first and second capacitors has not reached the prescribed level and further keeping the switching means on when the charge voltage of the second capacitor has not reached the prescribed level.

When the first and second discriminating means find that at least one between the charge voltage of the first capacitor and the charge voltage of the second capacitor has not reached the prescribed level set therefor, the charging control means responds by permitting on/off operation of the switching device for current chopping to enable generation of a high voltage in the step-up coil. When the charge voltage of the second capacitor is found to be below the second prescribed level, the charging control means further keeps the switching means on.

Therefore, when the charge voltage of the first capacitor has not reached the first prescribed level, the switching device for current chopping effects on/off operation to charge the first capacitor until the charge voltage thereof reaches the first prescribed level. When the charge voltage of the second capacitor has not reached the second prescribed level, the switching device for current chopping effects on/off operation and, in addition, the switching means is kept on to charge the second capacitor. When the charge voltage of the first capacitor is the same as or lower than charge voltage of the second capacitor at this time, charging of the first capacitor is effected simultaneously. When the charge voltage of the first capacitor is higher than the charge voltage of the second capacitor, only the second capacitor is charged. Once the charge voltage of the second capacitor reaches the second prescribed level, the switching means turns off. If the charge voltage of the first capacitor has reached the first prescribed level at this time, the on/off operation of the switching device for current chopping is stopped.

Although the invention is described hereinafter with reference to preferred embodiments composed of discrete components, a number of the means constituting the invention can instead be realized by executing a prescribed program with a microcomputer.

DETAILED DESCRIPTION OF THE PREFERRED EMBODIMENTS

Figure 1:
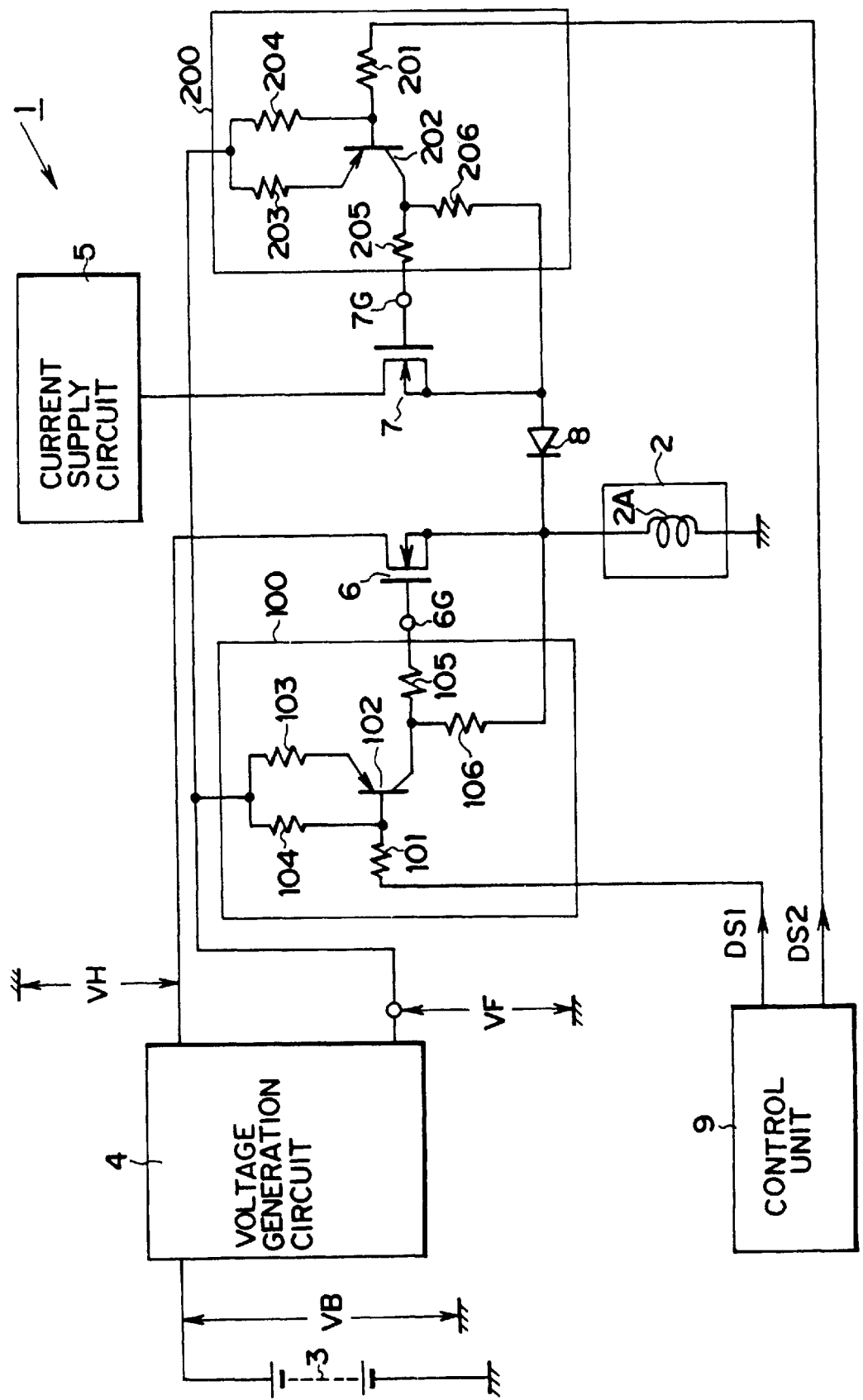
FIG. 1 is a schematic diagram showing a solenoid valve drive system that is an embodiment of the invention.

FIG. 1 is a schematic block diagram showing a solenoid valve drive system 1 that is an embodiment of the invention. The solenoid valve drive system 1 is configured to drive a solenoid valve 2 at high speed by first applying a high voltage to a solenoid coil 2A of the solenoid valve 2 for a prescribed time period at the initial stage of driving the solenoid valve 2 and thereafter passing operation hold current through the solenoid coil 2A. In FIG. 1, reference symbol 3 designates a battery, which serves as a low-voltage power supply, 4 a voltage generation circuit that steps up the output voltage VB of the battery 3 to a first high-voltage VH of about 100–200 V for initial driving of the solenoid valve 2 and a second high voltage VF of around 30 V, which is a voltage lower than the first high-voltage VH and higher than the output voltage VB, for driving the gates of n-channel FETs 6 and 7 explained later, and 5 a current supply circuit that supplies operation hold current to the solenoid coil 2A of the solenoid valve 2.

The first high-voltage VH from the voltage generation circuit 4 is applied to the solenoid coil 2A of the solenoid valve 2 through the n-channel FET 6 and the operation hold current from the current supply circuit 5 is supplied to the solenoid coil 2A of the solenoid valve 2 through the n-channel FET 7. Reference symbol 8 designates a reverse-current prevention diode. It prevents current from flowing to the current supply circuit 5 when the first high-voltage VH is applied to the solenoid coil 2A of the solenoid valve 2.

The gates 6G and 7G of the n-channel FETs 6 and 7 are connected to drive circuits 100 and 200 that on/off operate the n-channel FETs 6 and 7 in response to first and second drive control signals DS1 and DS2 from a control unit 9. The drive circuit 100 has an npn-type transistor 102. The first drive control signal DS1 is applied to the base of the npn-type transistor 102 through a resistor 101 and the second high voltage VF is applied to the emitter thereof through a resistor 103. The second high voltage VF is applied to the base of the npn-type transistor 102 through a resistor 104. The collector of the npn-type transistor 102 is connected to the gate 6G of the n-channel FET 6 through a resistor 105 and to the source of the n-channel FET 6 through a resistor 106.

The drive circuit 100 provided on the gate 6G side of the n-channel FET 6 thus utilizes the npn-type transistor 102 as a switching device. Specifically, the npn-type transistor 102 is driven by the second high voltage VF of considerably higher level than the output voltage VB of the battery 3 and is turned on and off in response to the first drive control signal DS1, thereby applying high voltage to the gate 6G to on/off control the n-channel FET 6. The supply of current to solenoid coil 2A can therefore be on/off controlled on the high side of the solenoid valve 2, while use of the n-channel FET 6 minimizes power loss.

The gate 7G of the n-channel FET 7 is supplied with the second high voltage VF and is connected with the drive circuit 200 for turning the n-channel FET 7 on and off in response to the second drive control signal DS2. The drive circuit 200 has the same configuration as the drive circuit 100. The earlier explanation of the drive circuit 100 therefore also applies to the drive circuit 200 except that the reference numerals of the components of the drive circuit 200 are greater by 100. The n-channel FET 7 is on/off controlled by high voltage applied to its gate 7G by the drive circuit 200 to thereby on/off control the hold current from the current supply circuit 5 with lower power loss.

At the initial stage of driving the solenoid valve 2, the drive circuit 100 operates in response to the first drive control signal DS1 to turn the n-channel FET 6 on for a prescribed time period, thereby applying the first high-voltage VH to the solenoid coil 2A of the solenoid valve 2 for the prescribed time period. Next, the drive circuit 200 operates in response to the second drive control signal DS2 to turn the n-channel FET 7 on, thereby supplying the operation hold current from the current supply circuit 5 to the solenoid coil 2A of the solenoid valve 2. Since the configuration of the control unit 9 for on/off controlling the n-channel FETs 6, 7 is well known, the detailed circuitry of the control unit 9 does not require illustration or explanation.

Figure 2:
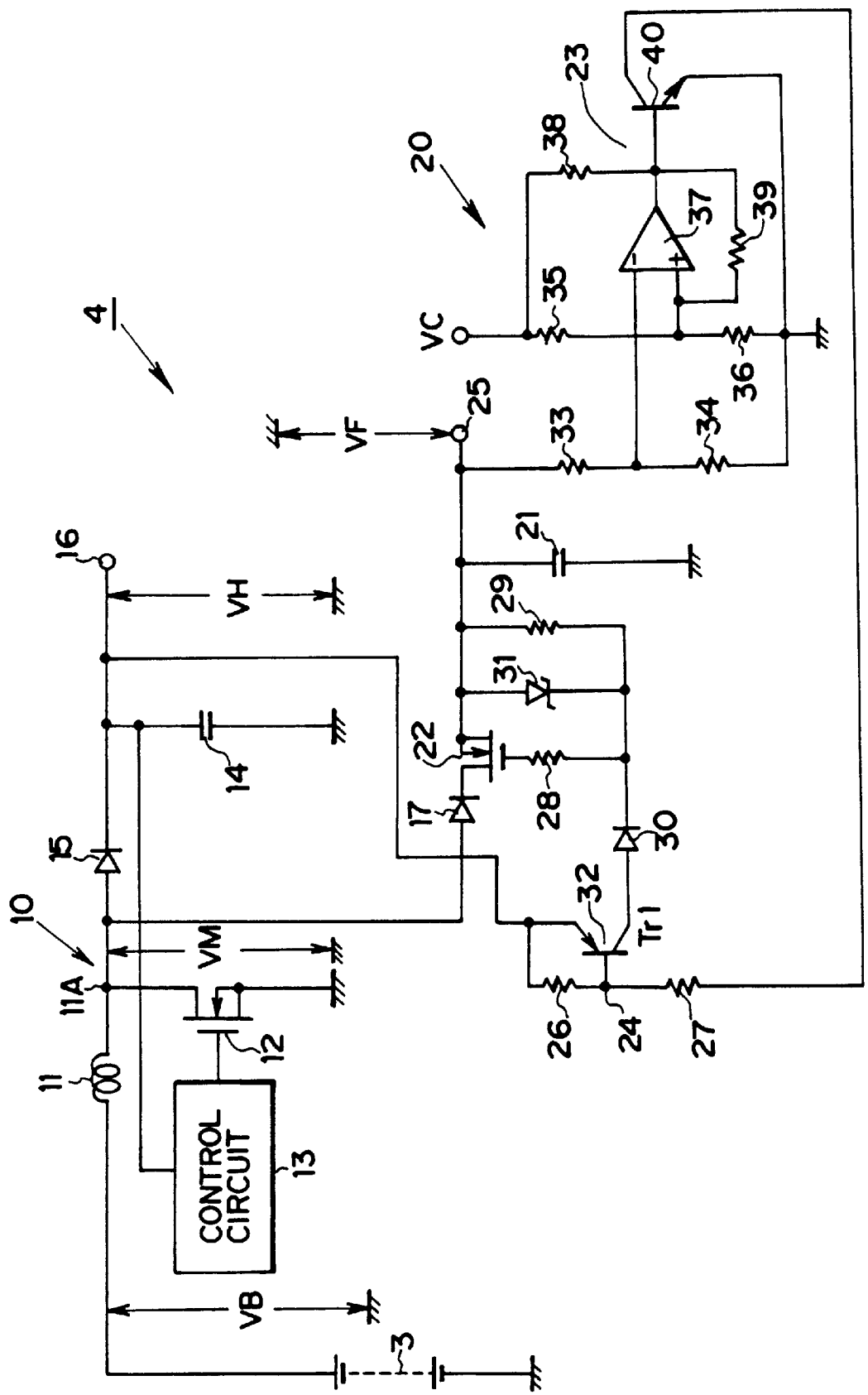
FIG. 2 is a detailed circuit diagram of the voltage generation circuit shown in FIG. 1.

FIG. 2 is a detailed circuit diagram of the voltage generation circuit 4. The voltage generation circuit 4 has a step-up circuit 10 for stepping up the output voltage VB of the battery 3, the low-voltage power supply. The step-up circuit 10 is of a conventional circuit configuration comprising a step-up coil 11 and a switching transistor 12 serving as a switching device for chopping current supplied from the battery 3 to the step-up coil 11, thereby generating a high voltage VM in the step-up coil 11. The high voltage VM charges a first capacitor 14 through a reverse-current prevention diode 15. The switching transistor 12 is on/off controlled by a control circuit 13 of conventional configuration, which receives the terminal voltage of the first capacitor 14 charged by the high voltage VM as feedback and discontinues on/off control of the switching transistor 12 when the terminal voltage of the first capacitor 14 reaches a prescribed value. The required first high-voltage VH is thus stored in the first capacitor 14 of the step-up circuit 10 of the foregoing configuration to make the first high-voltage VH available from a first output terminal 16.

The voltage generation circuit 4 is further provided with a supplementary circuit 20 that uses the high voltage VM generated in the step-up coil 11 of the step-up circuit 10 to produce the second high voltage VF for driving the gates of the n-channel FETs 6, 7 (FIG. 1). The supplementary circuit 20 comprises a second capacitor 21 for storing the second high voltage VF for n-channel FET driving produced using the high voltage VM generated in the step-up coil 11, a switching transistor 22 serving as a switching means for on/off controlling the high voltage VM generated in the step-up coil 11 to the second capacitor 21, a discriminator 23 for discriminating whether or not the terminal voltage of the second capacitor 21 has reached the required voltage level, and a switching control circuit 24 responsive to the discriminator 23 for keeping the switching transistor 22 on only when the terminal voltage of the second capacitor 21 has not reached the required voltage level.

One terminal of the second capacitor 21 is connected to a second output terminal 25 and the other terminal thereof is connected to ground. As shown in FIG. 2, the drain-source circuit of the switching transistor 22 and a reverse-current prevention diode 17 are connected in series between the one terminal of the second capacitor 21 and the connection point between the output side of the step-up coil 11 and the anode of the reverse-current prevention diode 15. The switching control circuit 24 for on/off controlling the switching transistor 22 comprises resistors 26–29, a diode 30, a voltage-regulation diode 31 and a transistor 32 connected in the manner shown.

The discriminator 23 comprises resistors 33 and 34 for dividing the voltage produced between the second output terminal 25 and ground, i.e., the charge voltage of the second capacitor 21, resistors 35 and 36 for dividing a prescribed stabilized low voltage VC to produce a reference voltage, and a voltage comparator 37 for comparing the levels of the voltage divided by the resistors 33, 34 and the reference voltage. The discriminator 23 further comprises a pull-up resistor 38 and a feedback resistor 39. The output of the voltage comparator 37 is connected to the base of a transistor 40 whose emitter is connected to ground. The collector of the transistor 40 is connected to one terminal of the resistor 27. Therefore, when the charge voltage of the second capacitor 21, i.e., the level of the second high voltage VF at the second output terminal 25, drops to the point that the voltage level at the negative input terminal of the voltage comparator 37 falls below the level of the reference voltage, the output of the voltage comparator 37 becomes high level to turn on the transistor 40.

Since the collector of the transistor 40 is connected to the first output terminal 16 of the step-up circuit 10 through the resistors 26 and 27, the transistor 32 is turned on when the transistor 40 turns on and, therefore, the switching transistor 22 becomes conductive.

The level of the reference voltage applied to the positive input terminal of the voltage comparator 37 is set to be the same as the level of the divided voltage produced by the resistors 33, 34 when the charge voltage of the second capacitor 21, i.e., second high voltage VF at the second output terminal 25, is at a prescribed level. When the second high voltage VF rises above the prescribed level, therefore, the transistor 40 turns off so that the transistor 32 turns off, whereby the switching transistor 22 becomes nonconductive.

The operation of the voltage generation circuit 4 shown in FIG. 2 will now be explained with reference to FIGS. 3A–3F.

Figure 3:
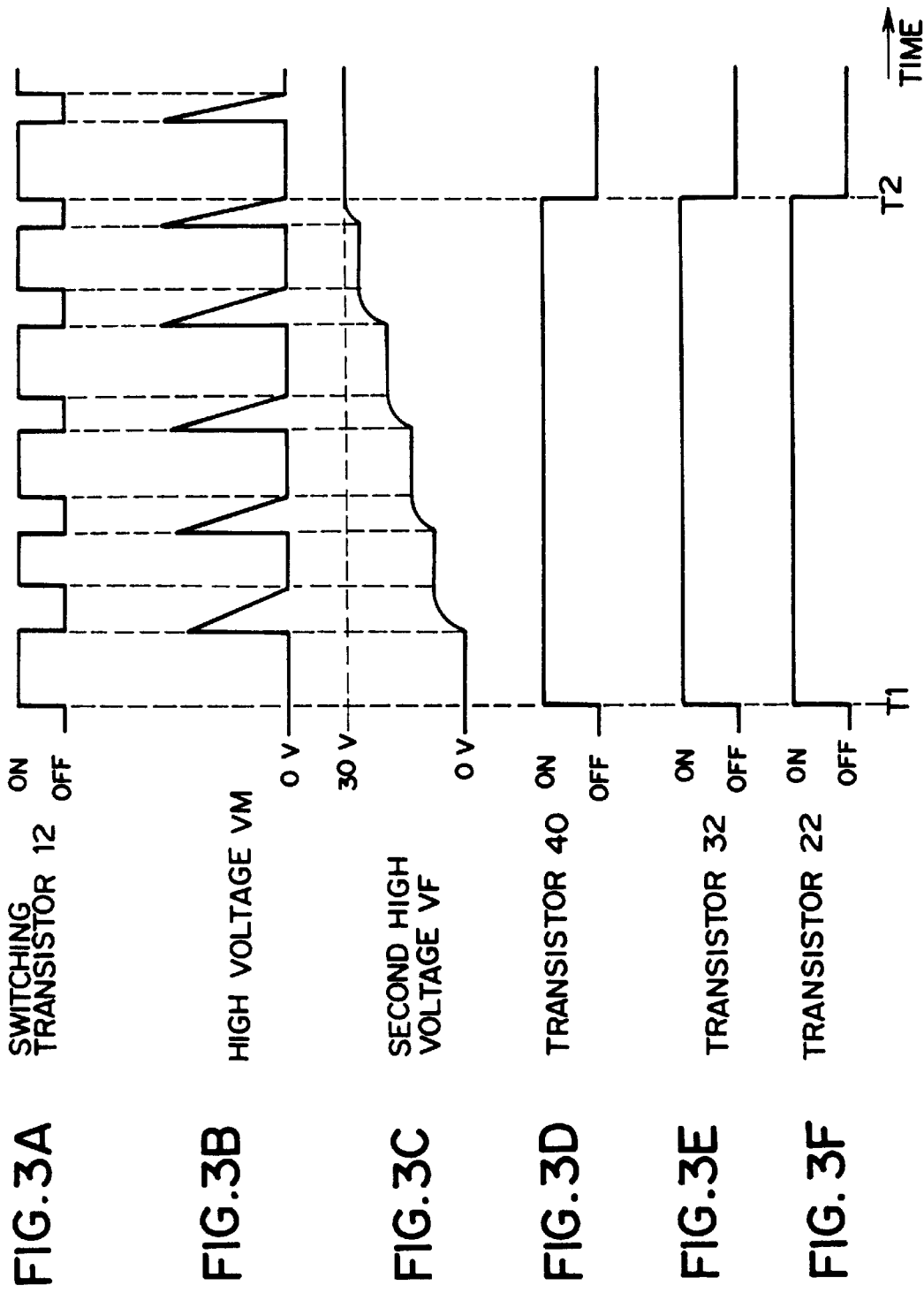
FIGS. 3A to 3F are diagrams showing waveforms of signals at different sections of the voltage generation circuit shown in FIG. 2 for explaining the operation thereof.

When the control circuit 13 puts the switching transistor 12 into on/off operation at time T1 as shown in FIG. 3A, a pulse-like high voltage induced in the step-up coil 11 in response to the on/off operation appears at an output terminal 11A of the step-up coil 11 as the high voltage VM (FIG. 3B).

Since the high voltage VM is applied to the first capacitor 14 through the diode 15, the first capacitor 14 is progressively charged so that the level of the first high-voltage VH available at the first output terminal 16 increases over time to eventually stabilize at a prescribed level.

On the other hand, since at time T1 the terminal voltage of the second capacitor 21, i.e., the second high voltage VF, is lower than the prescribed level (30 V in this embodiment), the transistor 40 of the discriminator 23 turns on (FIG. 3D) to turn on the transistor 32 of the switching control circuit 24 (FIG. 3E) and put the switching transistor 22 in the conductive (on) state (FIG. 3F). Since the second capacitor 21 is therefore charged by the application of the high voltage VM thereto, the level of the second high voltage VF increases over time as shown in FIG. 3C. When the level of the second high voltage VF reaches the prescribed level of 30 V at time T2, the transistor 40 of the discriminator 23 turns off to put the switching transistor 22 in nonconductive (off) state and stop the charging of the second capacitor 21 by the high voltage VM. The reverse-current prevention diode 15 prevents the charge stored in the first capacitor 14 from passing to the second capacitor 21 during the second capacitor charging operation. The second capacitor 21 is invariably charged by the step-up circuit 10 at the time power is first supplied to the solenoid valve drive system 1 because the first high-voltage VH is approximately zero at power-on.

Since the solenoid valve drive system 1 is configured to charge the second capacitor 21 by use of the step-up coil 11 and the switching transistor 12 of the step-up circuit 10, the second high voltage VF can be secured without greatly increasing the cost of the circuit. The required high voltages can therefore be obtained with a circuit that is compact and low in cost. The second high voltage VF can be used not only for the purpose shown in FIG. 1 but also for driving other switching devices (not shown) requiring relatively high operating voltage. The second high voltage VF of the required level can be obtained with high efficiency since charging of the second capacitor 21 is effected only when necessary.

The embodiment of the invention shown in FIG. 2 uses the switching transistor 22 as the switching means for controlling the charging of the second capacitor 21. However, the circuit can be further simplified by replacing the switching transistor 22 with a self-hold type switching device, specifically a silicon controlled rectification device (thyristor).

Figure 4:
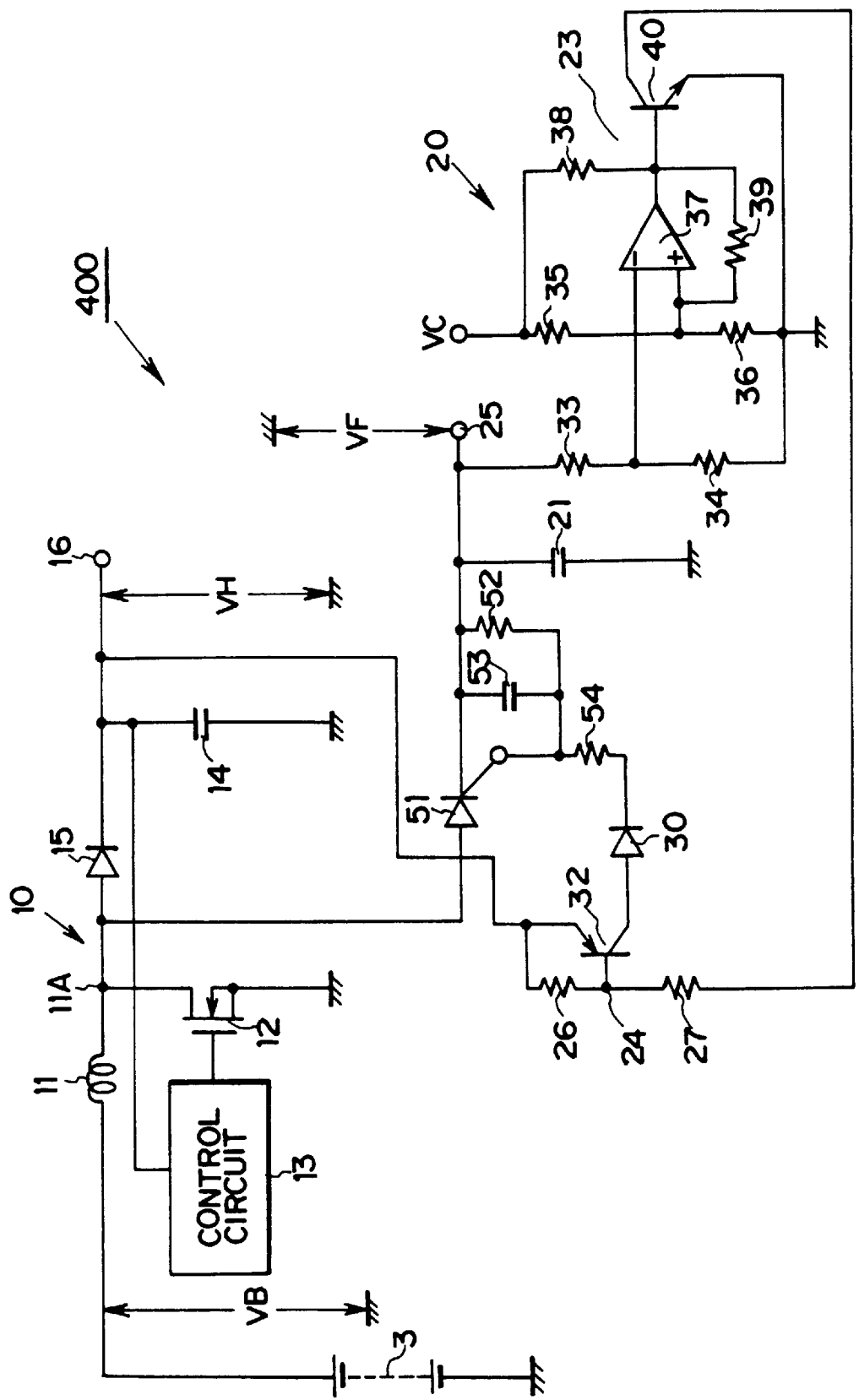
FIG. 4 is a detailed circuit diagram of a modification of the voltage generation circuit shown in FIG. 2.

FIG. 4 is a circuit diagram showing an essential portion of another embodiment of the solenoid valve drive system according to the invention, in which a thyristor device is used to control the charging current supplied to the second capacitor 21. As shown in FIG. 4, the voltage generation circuit 400 of this embodiment of the solenoid valve drive system differs from the voltage generation circuit 4 shown in FIG. 2 only in the points that the switching transistor 22 is replaced with a thyristor 51, a parallel circuit of a resistor 52 and a capacitor 53 is provided between the cathode and gate of the thyristor 51, and the collector of the transistor 32 is connected to the gate of the thyristor 51 through the diode 30 and a resistor 54. Portions in FIG. 4 that correspond to those in FIG. 2 are assigned the same reference symbols as those in FIG. 2 and will not be explained again.

The operation of the voltage generation circuit 400 shown in FIG. 4 will now be explained with reference to FIGS. 5A–5F. When the control circuit 13 puts the switching transistor 12 into on/off operation at time TA (FIG. 5A), the pulse-like high voltage VM appearing at the output terminal 11A of the step-up coil 11 (FIG. 5B) is applied to the first capacitor 14 through the diode 15, whereby the first capacitor 14 is charged to make the required first high-voltage VH available at the first output terminal 16.

Figure 5:
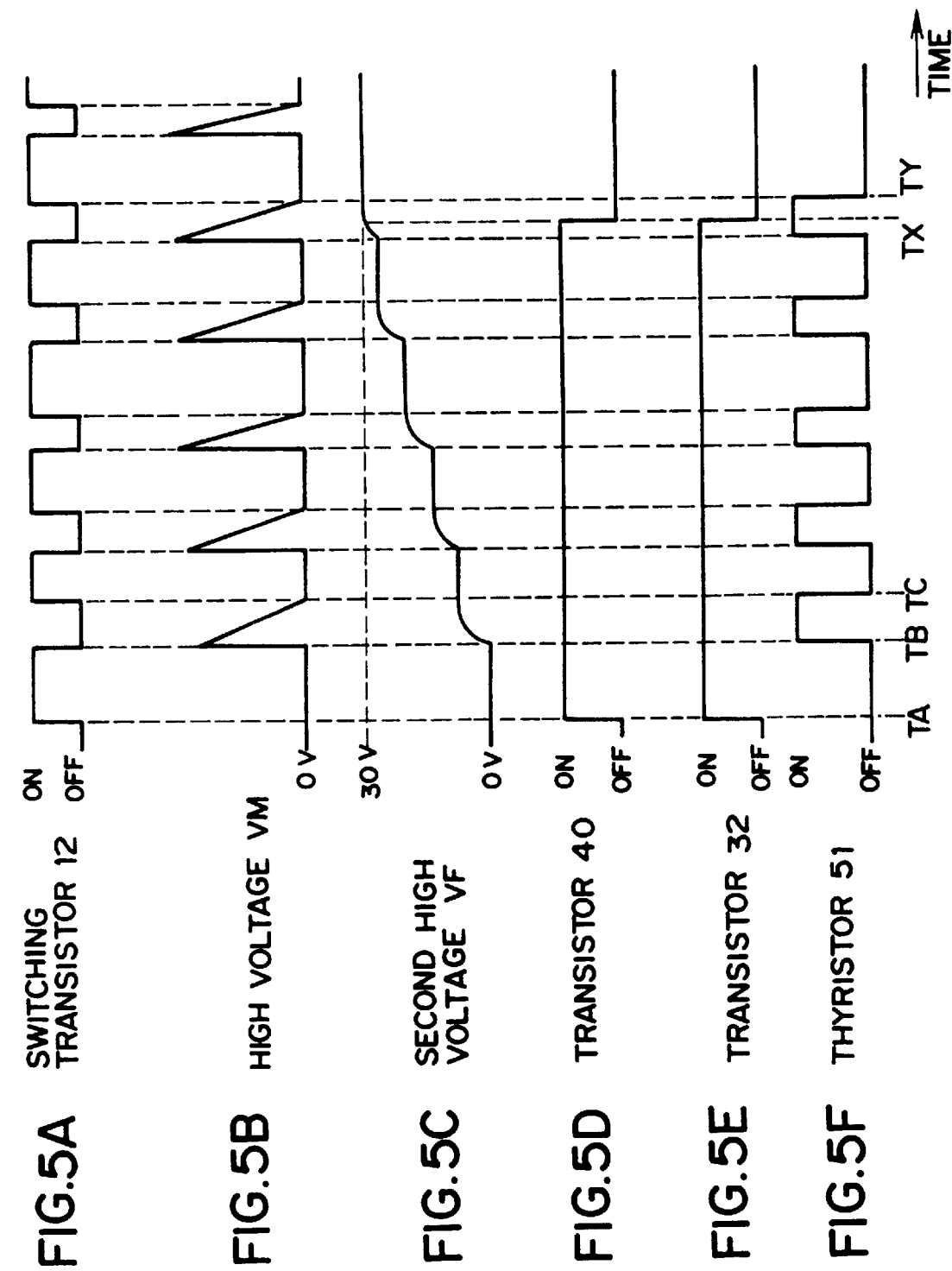
FIGS. 5A to 5F are diagrams showing waveforms of signals at different sections of the voltage generation circuit shown in FIG. 4 for explaining the operation thereof.

Since at time TA the terminal voltage of the second capacitor 21, i.e., the second high voltage VF, is lower than the prescribed level of 30 V, the transistor 40 of the discriminator 23 turns on (FIG. 5D) to turn on the transistor 32 of the switching control circuit 24 (FIG. 5E). The first high-voltage VH is therefore applied to the gate of the thyristor 51 through transistor 32, the diode 30 and the resistor 54. The thyristor 51 remains off, however, since the anode potential of the thyristor 51 is still substantially at ground level at time TA. The level of the high voltage VM rises abruptly at time TB. Since the high voltage VM is applied to the anode of the thyristor 51, the thyristor 51 now turns on. Since the second capacitor 21 is therefore charged by the application of the high voltage VM thereto through the thyristor 51, the charge voltage thereof increases gradually (FIG. 5C). When the level of the high voltage VM returns to ground level at time TC, the thyristor 51 turns off and charging of the second capacitor 21 is stopped.

In the same manner, the thyristor 51 thereafter repeatedly turns on and off in response to change in the level of the high voltage VM to effect intermittent charging of the second capacitor 21. The charging of the second capacitor 21 thus proceeds until the prescribed level of the second high voltage VF (30 V) is reached at time TX, whereupon the transistor 40 of the discriminator 23 turns off and the transistor 32 turns off simultaneously. Since the level of the high voltage VM has not yet fallen to zero at this time point, however, the thyristor 51 stays on. When the level of the high voltage VM reaches zero at time point TY, the thyristor 51 turns off to discontinue charging of the second capacitor 21 by the high voltage VM. Use of the thyristor 51 therefore makes the diode 17 of FIG. 2 unnecessary. The second capacitor 21 is invariably charged by the step-up circuit 10 at the time power is first supplied to the solenoid valve drive system 1 because the first high-voltage VH is at zero level at power-on.

Figure 6:
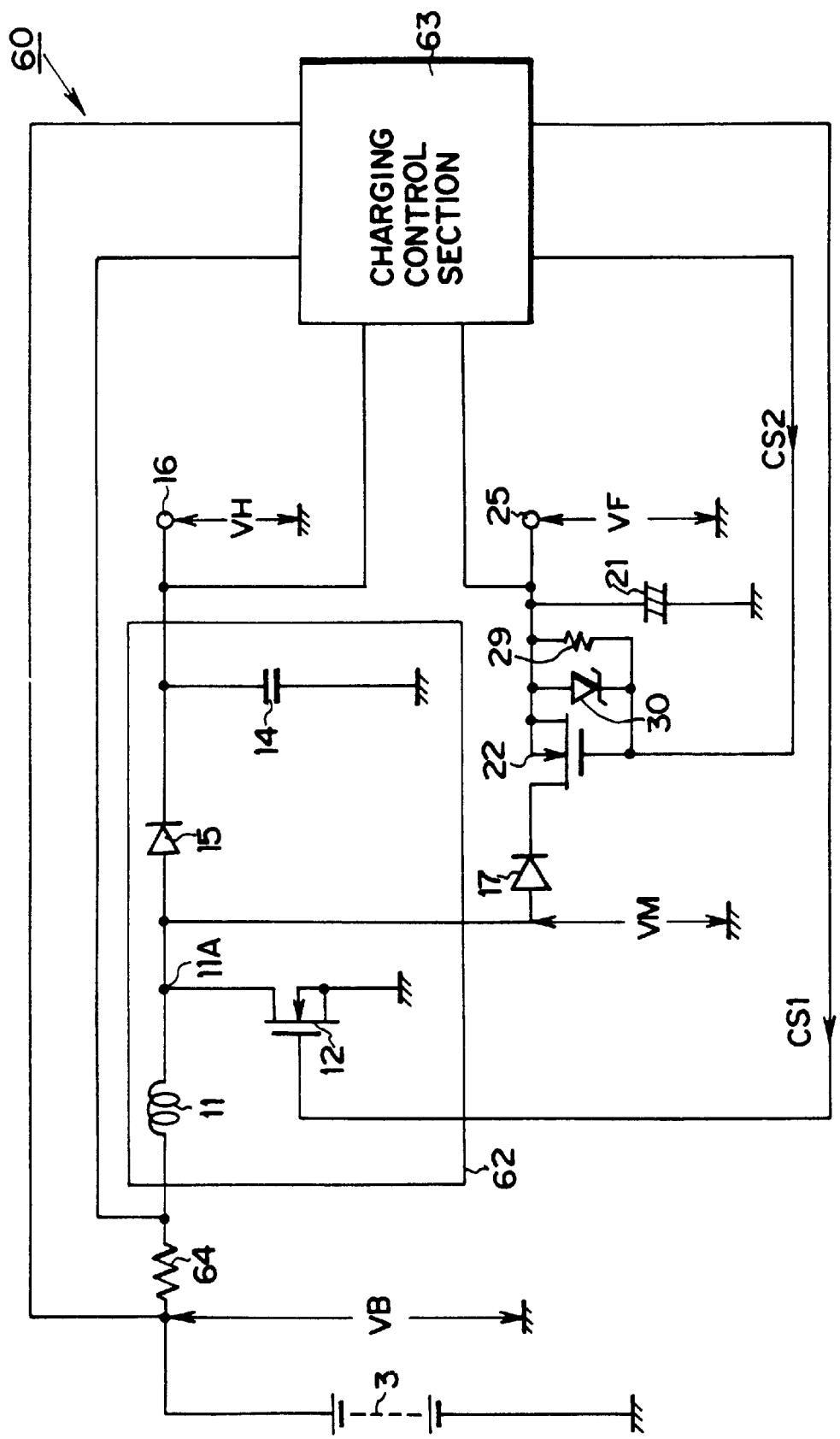
FIG. 6 is a detailed circuit diagram showing another configuration of the voltage generation circuit shown in FIG. 1.

FIG. 6 shows another configuration of the voltage generation circuit of the solenoid valve drive system 1 of FIG. 1 in accordance with another embodiment of the invention. This voltage generation circuit 60 has a step-up circuit 62 for stepping up the output voltage VB of the battery 3 to the first high-voltage VH. The step-up circuit 62 has the substantially the same configuration as the step-up circuit 10 shown in FIG. 2. Portions of the step-up circuit 62 in FIG. 6 that correspond to those of the step-up circuit 10 are therefore assigned the same reference symbols as those of the step-up circuit 10 and will not be explained again. In the voltage generation circuit 60 of FIG. 6, a resistor 64 is inserted between the battery 3 and the step-up circuit 62 and the switching transistor 12 is on/off controlled based on a first charging control signal CS1 from a charging control section 63 that receives the voltage developed across the resistor 64 as feedback.

The high voltage VM appearing at the output terminal 11A of the step-up coil 11 is used to make the second high voltage VF for supply to the drive circuits 100, 200 for driving the n-channel FETs 6, 7 of FIG. 1 available at the second output terminal 25. For this, the second capacitor 21 is connected between the second output terminal 25 and ground. To control application of the high voltage VM appearing at the output terminal 11A of the step-up coil 11 to the second capacitor 21, the diode 17 and the switching transistor 22 are connected in series between the output terminal 11A and the second output terminal 25 similarly to the circuit configuration of FIG. 2. Reference symbol 29 designates a resistor and 31 a voltage-regulation diode. The switching transistor 22 is on/off controlled by a second control signal CS2 from the charging control section 63.

The charging control section 63 receives the first high-voltage VH and the second high voltage VF appearing at the first and second output terminals 16 and 25 as inputs and discriminates whether or not they have reached respectively prescribed first and second levels. When the charge voltage of even one of the first capacitor 14 and the second capacitor 21 has not reached its prescribed level, the charging control section 63 outputs the first charging control signal CS1 for on/off controlling the switching transistor 12 to the gate of the switching transistor 12. The first charging control signal CS1 is a pulse signal with a signal waveform corresponding to that shown in FIG. 3A. The switching transistor 12 repeatedly turns on and off in response to the first charging control signal CS1. The resulting high voltage VM produced at the output terminal 11A of the step-up coil 11 charges the first capacitor 14. If at this time the charging control section 63 discriminates that the charge voltage of the second capacitor 21 has not reached the prescribed second level, it further outputs the second control signal CS2 to turn on the switching transistor 22. The second capacitor 21 is therefore charged by application of the high voltage VM.

When the charge voltage of the first capacitor 14 has not reached the first prescribed level, the switching transistor 12 is on/off controlled to continue charging of the first capacitor 14 until its charge voltage reaches the first prescribed level. At this time, if the charge voltage of the second capacitor 21 has reached the second prescribed level, the switching transistor 22 remains off. If it has not, the switching transistor 22 is turned on and the second capacitor 21 is charged.

Thus when the charge voltage of the second capacitor 21 has not reached the second prescribed level, the switching transistor 12 is on/off controlled and the switching transistor 22 is kept on, thereby charging the second capacitor 21. At this time, if the charge voltage of the first capacitor 14 is the same as or lower than the charge voltage of the second capacitor 21, the first capacitor 14 is simultaneously charged. If the charge voltage of the first capacitor 14 is higher than the charge voltage of the second capacitor 21, only the second capacitor 21 is charged. Once the charge voltage of the second capacitor 21 reaches the second prescribed level, the switching transistor 22 is turned off. If the charge voltage of the first capacitor 14 has reached the first prescribed level at this time, the on/off operation of the switching transistor 12 is also stopped.

Figure 7:
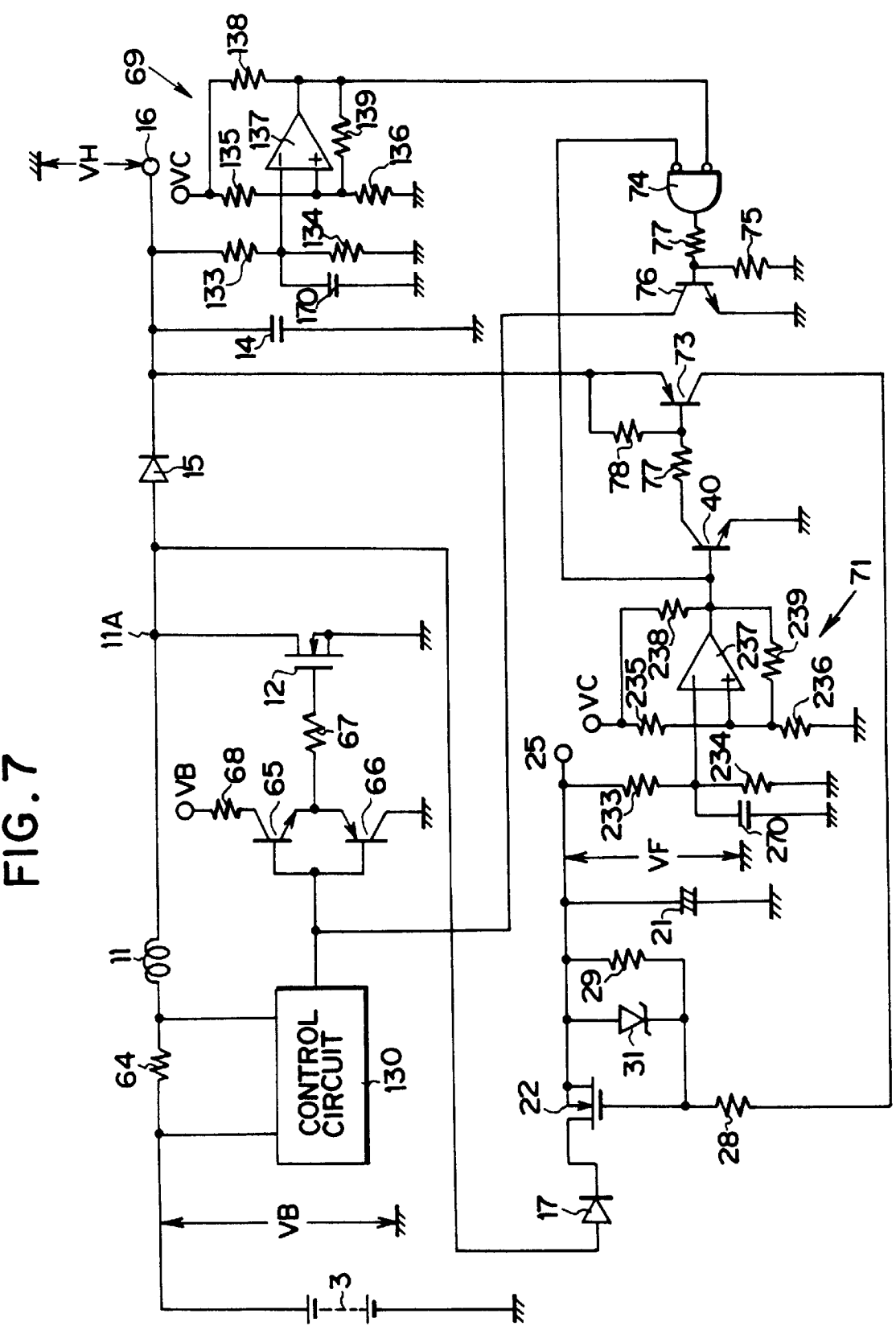
FIG. 7 is a detailed circuit diagram of the voltage generation circuit shown in FIG. 6.

FIG. 7 is a circuit diagram showing the configuration of the voltage generation circuit 60 of FIG. 6 in greater detail. Portions in FIG. 7 corresponding to portions in FIG. 6 are assigned the same reference symbols as those in FIG. 6. A control circuit 130 of conventional configuration detects the voltage drop across a resistor 64 connected in series with the step-up coil 11. The control circuit 13 is responsive to the detection result for outputting a pulse signal through a series circuit composed of a pair of transistors 65, 66 and a resistor 67 to the gate of the switching transistor 12 for on/off driving the switching transistor 12. Reference numeral 68 designates a collector resistor for current control.

A first discriminator, designated generally by reference symbol 69, discriminates whether or not the charge voltage of the first capacitor 14 has reached the first prescribed level. The circuit configuration of the first discriminator 69 is basically the same as that of the discriminator 23 shown in FIG. 2. The earlier explanation of the discriminator 23 therefore also applies to the first discriminator 69 except that the reference numerals of the components of the first discriminator 69 are greater by 100. A capacitor 170 is further incorporated for noise removal. The values of the resistors 133–136 are set so that the output of the voltage comparator 137 is high level when the charge voltage of the first capacitor 14 is smaller than the first prescribed level.

The output of the voltage comparator 137 is connected to one input terminal of a logic gate 74.

A second discriminator, designated generally by reference numeral 71, discriminates whether or not the charge voltage of the second capacitor 21, i.e., the second high voltage VF, has reached the second prescribed level. The circuit configuration of the second discriminator 71 is also basically the same as that of the discriminator 23 shown in FIG. 2. The earlier explanation of the discriminator 23 therefore also applies to the second discriminator 71 except that the reference numerals of the components of the second discriminator 71 are greater by 200. A capacitor 270 is further incorporated for noise removal. The values of the resistors 233–236 are set so that the output of the voltage comparator 237 is high level when the charge voltage of the second capacitor 21 is smaller than the second prescribed level. The transistor 40 therefore turns on when the charge voltage of the second capacitor 21 is smaller than the second prescribed level. Since the collector circuit of the transistor 40 is connected through resistors 77 and 78 to the base of a transistor 73 whose emitter is connected to the first output terminal 16 and whose collector is connected to the gate of the switching transistor 22 through the resistor 28, the transistor 73 turns on when the transistor 40 turns on, thereby applying the charge voltage of the first capacitor 14 to the gate of the switching transistor 22. The switching transistor 22 therefore turns on to charge the second capacitor 21 by application of the high voltage VM.

The output of the voltage comparator 137 of the first discriminator 69 is applied to one input terminal of the logic gate 74. The output of the voltage comparator 237 of the second discriminator 71 is applied to the other input terminal of the logic gate 74. The logic of the logic gate 74 is such that its output is low level when the output of at least one of the voltage comparators 137, 237 is high level. The base of a transistor 76 is connected is connected through a resistor 77 to the output terminal of the logic gate 74 and through a resistor 75 to ground. The collector-emitter circuit of the transistor 76 is connected between the output of the control circuit 130 and ground. As a result, the output of the logic gate 74 is high level and the transistor 76 turns on to turn off the switching transistor 12 only when the output of the voltage comparator 137 and the output of the voltage comparator 237 are simultaneously low level. When even one of the first and second capacitors 14, 21 is not in the required charged state, the output of the logic gate 74 is low level, the transistor 76 is off.

The collector-emitter circuit of the transistor 76 is connected between the output of the control circuit 130 and ground. Thus, the transistor 76 is turned off when the output of the logic gate 74 becomes low level, and the output of the control circuit 130 is applied through the transistors 65 and 66 to the gate of the switching transistor 12. The switching transistor 12 is therefore on/off controlled and the resulting high voltage VM produced at the output terminal 11A by the step-up coil 11 charges the first capacitor 14. If the charge voltage of the second capacitor 21 is below the second prescribed level at this time, the switching transistor 22 is also turned on by the second discriminator 71, whereby charging of the second capacitor 21 is effected simultaneously.

Since the configurations of FIGS. 6 and 7 enable the step-up coil 11, switching transistor 12 and the like to be used in common for charging both the first and second capacitors 14, 21, they offer the advantages of fewer components, lower cost and reduced size. They further allow the second capacitor 21 to be charged independently of the charging cycle of the first capacitor 14. Fluctuation of the second high voltage VF obtained at the second output terminal 25 can therefore be effectively suppressed to secure the required high voltage stably from the second capacitor 21.

The invention is not limited to the specific configurations of the embodiments explained in the foregoing. For instance, the second high voltage VF can be used not only for driving the FET gates but also for various other appropriate purposes. The invention thus provides a compact, low-cost solenoid valve drive system that can generate two types of high voltages usable for different purposes within the system with good efficiency.

What is claimed is:

1. A solenoid valve drive system having a step-up circuit which includes a step-up coil, a switching device for current chopping and a first capacitor, produces a high voltage in the step-up coil by on/off operating the switching device to chop current supplied to the step-up coil from a low-voltage power supply and stores the high voltage in the first capacitor, the high voltage stored in the first capacitor being applied to a solenoid valve for a prescribed time period at an initial stage of solenoid valve driving to drive the solenoid valve at high speed, the solenoid valve drive system comprising:

a second capacitor,
   switching means for controlling supply of high-voltage energy produced in the step-up coil to the second capacitor,
   discriminating means for discriminating whether or not a charge voltage of the second capacitor has reached a prescribed level, and
   control means responsive to the discriminating means for keeping the switching means on only when the charge voltage of the second capacitor has not reached the prescribed level.

2. A system as claimed in claim 1, wherein the switching means includes a semiconductor switching device connected between an output side of the step-up coil and an input side of the second capacitor.

3. A system as claimed in claim 2, wherein the semiconductor switching device is a field-effect transistor whose drain-source circuit is connected between the output side of the step-up coil and the input side of the second capacitor.

4. A system as claimed in claim 3, further comprising a reverse-current prevention diode connected in series with the drain-source circuit to prevent current from flowing from the second capacitor to the step-up coil.

5. A system as claimed in claim 1, wherein the discriminating means has a voltage-dividing circuit for dividing a terminal voltage of the second capacitor and a voltage comparator for comparing a divided voltage produced by the voltage-dividing circuit and a prescribed reference voltage, the voltage comparator producing an electric signal indicating whether or not the terminal voltage of the second capacitor has reached a prescribed level.

6. A system as claimed in claim 2, wherein the control means has a resistance voltage divider applied with a terminal voltage of the first capacitor, the resistance voltage divider being responsive to a discrimination by the discriminating means that a terminal voltage of the second capacitor has reached the prescribed level to output a divided output voltage and the semiconductor switching device being turned on in response to the divided output voltage.

7. A system as claimed in claim 2, wherein the semiconductor switching device is a silicon controlled rectification device.

8. A solenoid valve drive system having a step-up circuit which includes a step-up coil, a switching device for current chopping and a first capacitor, produces a high voltage in the step-up coil by on/off operating the switching device to chop current supplied to the step-up coil from a low-voltage power supply and stores the high voltage in the first capacitor, the high voltage stored in the first capacitor being applied to a solenoid valve for a prescribed time period at an initial stage of solenoid valve driving to drive the solenoid valve at high speed, the solenoid valve drive system comprising:

first semiconductor switching means connected between a high side of a solenoid coil of the solenoid valve and an output of the step-up circuit, a first drive circuit for outputting a first gate drive voltage for on/off controlling the first semiconductor switching means, a control unit for outputting a first control signal for controlling the first drive circuit to apply the first high voltage to the solenoid coil for a prescribed time period, a second capacitor for storing a second high voltage, switching means for controlling supply of high-voltage energy produced in the step-up coil to the second capacitor, discriminating means for discriminating whether or not a charge voltage of the second capacitor has reached a prescribed level higher than an output voltage of the low-voltage power supply and lower than the first high voltage, and control means responsive to the discriminating means for keeping the switching means on only when the charge voltage of the second capacitor has not reached the prescribed level, the second high voltage stored in the second capacitor being supplied as a power supply voltage of the first drive circuit.

9. A system as claimed in claim 8, wherein the first semiconductor switching means is an n-channel field-effect transistor whose drain-source circuit is connected between the high side of the solenoid coil and the output of the step-up circuit.

10. A system as claimed in claim 9, wherein the first drive circuit is responsive to the first control signal from the control unit for applying a voltage obtained by dividing the second high voltage to a gate of the n-channel field-effect transistor as the first gate drive voltage.

11. A system as claimed in claim 10, wherein the first drive circuit comprises an npn-type transistor turned on and off in response to the first control signal, the npn-type transistor outputting the first gate drive voltage obtained by dividing the second high voltage when in a prescribed operating state.

12. A system as claimed in claim 8, wherein the switching means is switching circuit means including a semiconductor switching means connected between the output of the step-up circuit and an input side of the second capacitor.

13. A system as claimed in claim 12, wherein the semiconductor switching means is a field-effect transistor whose drain-source circuit is connected between the output of the solenoid coil and the input side of the second capacitor.

14. A system as claimed in claim 13, further comprising a reverse-current prevention diode connected in series with the drain-source circuit to prevent current from flowing from the second capacitor to the step-up coil.

15. A system as claimed in claim 8, wherein the discriminating means has a voltage-dividing circuit for dividing a terminal voltage of the second capacitor and a voltage comparator for comparing a divided voltage produced by the voltage-dividing circuit and a prescribed reference voltage, the voltage comparator producing an electric signal indicating whether or not the terminal voltage of the second capacitor has reached a prescribed level.

16. A system as claimed in claim 12, wherein the control means has a resistance voltage divider applied with a terminal voltage of the first capacitor, the resistance voltage divider being responsive to a discrimination by the discriminating means that a terminal voltage of the second capacitor has reached the prescribed level to output a divided output voltage and the semiconductor switching device being turned on in response to the divided output voltage.

17. A system as claimed in claim 12, wherein the semiconductor switching device is a silicon controlled rectification device.

18. A system as claimed in claim 8, further comprising current supply means for supplying the solenoid valve with operation current required for keeping the solenoid valve in a required operating state after application of the first high voltage to the solenoid coil for the prescribed time period, second semiconductor switching means provided between the current supply means and the high side of the solenoid coil, and a second drive circuit for outputting a second gate drive voltage for on/off controlling the second semiconductor switching means, the second high voltage being supplied as a power supply voltage of the second drive circuit and the second drive circuit being responsive to the second control signal from the control unit for outputting the second gate drive voltage after elapse of the prescribed time period to keep the second semiconductor switching means on.

19. A system as claimed in claim 18, wherein the second semiconductor switching means is an n-channel field-effect transistor whose drain-source circuit is connected between the high side of the solenoid coil and the output of the current supply means.

20. A system as claimed in claim 19, wherein the second drive circuit is responsive to the second control signal for applying a voltage obtained by dividing the second high voltage to a gate of the n-channel field-effect transistor as the second gate drive voltage.

21. A solenoid valve drive system that applies high voltage to a solenoid valve for a prescribed time period at an initial stage of solenoid valve driving to drive the solenoid valve at high speed, the solenoid valve drive system comprising:

a step-up circuit having a step-up coil, a switching device for current chopping and a first capacitor, the step-up circuit producing a high voltage in the step-up coil by on/off operating the switching device to chop current supplied to the step-up coil from a low-voltage power supply and storing the high voltage in the first capacitor, a second capacitor, switching means for controlling supply of high-voltage energy produced in the step-up coil to the second capacitor, first discriminating means for discriminating whether or not a charge voltage of the first capacitor has reached a first prescribed level, second discriminating means for discriminating whether or not a charge voltage of the second capacitor has reached a second prescribed level, and charging control means responsive to the first and second discriminating means for on/off operating the switching device for current chopping when at least the charge voltage of the first capacitor has not reached the first prescribed level or the charge voltage of the second capacitor has not reached the second prescribed level and further keeping the switching means on when the charge voltage of the second capacitor has not reached the second prescribed level.

22. A system as claimed in claim 21, wherein the charging control means includes first charging control circuit means responsive to the first and second discriminating means for permitting on/off operation of the switching device for current chopping when at least the charge voltage of the first capacitor has not reached the first prescribed level or the charge voltage of the second capacitor has not reached the second prescribed level and second charging control circuit means responsive to the second discriminating means for keeping the switching means on when the charge voltage of the second capacitor has not reached the second prescribed level.

23. A system as claimed in claim 21, wherein the switching means is switching circuit means including a semiconductor switching means connected between the output of the step-up circuit and an input side of the second capacitor.

24. A system as claimed in claim 23, wherein the semiconductor switching means is a field-effect transistor whose drain-source circuit is connected between the output of the solenoid coil and the input side of the second capacitor.

25. A system as claimed in claim 24, further comprising a reverse-current prevention diode connected in series with the drain-source circuit to prevent current from flowing from the second capacitor to the step-up coil.

26. A system as claimed in claim 21, wherein the voltage produced in the step-up coil is supplied to the first capacitor through a diode.

27. A solenoid valve drive system having a step-up circuit which includes a step-up coil, a switching device for current chopping and a first capacitor, produces a high voltage in the step-up coil by on/off operating the switching device to chop current supplied to the step-up coil from a low-voltage power supply and stores the high voltage in the first capacitor, the high voltage stored in the first capacitor being applied to a solenoid valve for a prescribed time period at an initial stage of solenoid valve driving to drive the solenoid valve at high speed, the solenoid valve drive system comprising:

first semiconductor switching means connected between a high side of a solenoid coil of the solenoid valve and an output of the step-up circuit, a first drive circuit for outputting a first gate drive voltage for on/off controlling the first semiconductor switching means, a control unit for outputting a first control signal for controlling the first drive circuit to apply the first high voltage to the solenoid coil for a prescribed time period, a second capacitor for storing a second high voltage, switching means for controlling supply of high-voltage energy produced in the step-up coil to the second capacitor, first discriminating means for discriminating whether or not a charge voltage of the first capacitor has reached a first prescribed level, second discriminating means for discriminating whether or not a charge voltage of the second capacitor has reached a second prescribed level higher than an output voltage of the low-voltage power supply and lower than the first high voltage, and charging control means responsive to the first and second discriminating means for on/off operating the switching device for current chopping when at least the charge voltage of the first capacitor has not reached the first prescribed level or the charge voltage of the second capacitor has not reached the second prescribed level and further keeping the switching means on when the charge voltage of the second capacitor has not reached the second prescribed level, the second high voltage stored in the second capacitor being supplied as a power supply voltage of the first drive circuit.

28. A system as claimed in claim 27, further comprising current supply means for supplying the solenoid valve with operation current required for keeping the solenoid valve in a required operating state after application of the first high voltage to the solenoid coil for the prescribed time period, second semiconductor switching means provided between the current supply means and the high side of the solenoid coil and a second drive circuit for outputting a second gate drive voltage for on/off controlling the second semiconductor switching means, the second high voltage being supplied as a power supply voltage of the second drive circuit and the second drive circuit being responsive to the second control signal from the control unit for outputting the second gate drive voltage after elapse of the prescribed time period to keep the second semiconductor switching means on.

29. A solenoid valve drive system having a step-up circuit which includes a step-up coil, a switching device for current chopping and a first capacitor, produces a high voltage in the step-up coil by on/off operating the switching device to chop current supplied to the step-up coil from a low-voltage power supply and stores the high voltage in the first capacitor, the high voltage stored in the first capacitor being applied to a solenoid valve for a prescribed time period at an initial stage of solenoid valve driving to drive the solenoid valve at high speed, the solenoid valve drive system comprising:

a second capacitor, switching means for controlling supply of high-voltage energy produced in the step-up coil to the second capacitor, and discriminating means for discriminating whether or not a charge voltage of the second capacitor has reached a prescribed level, the switching means being kept on in response to the discriminating means only when the charge voltage of the second capacitor has not reached the prescribed level.

\* \* \* \* \*